May 14, 1968     W. L. ROBERTS     3,383,591
METHOD AND APPARATUS FOR INDICATING WEAR ON ROLLS BY COMBINING
SIGNALS PROPORTIONAL TO ROLLING FORCE AND SPEED
Filed Oct. 14, 1964
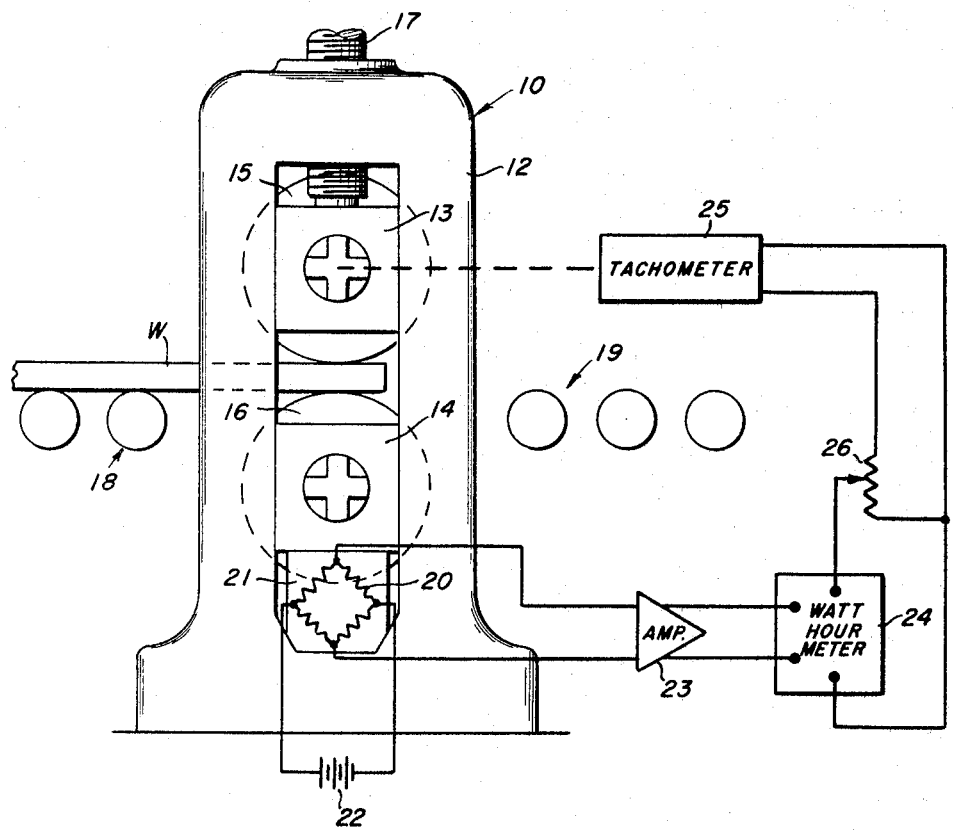
INVENTOR
WILLIAM L. ROBERTS
By Donald G. Dalton
Attorney United States Patent Office 3,383,591
Patented May 14, 1968

3,383,591
METHOD AND APPARATUS FOR INDICATING WEAR ON ROLLS BY COMBINING SIGNALS PROPORTIONAL TO ROLLING FORCE AND SPEED
William L. Roberts, Murrysville, Pa., assignor to United States Steel Corporation, a corporation of Delaware
Filed Oct. 14, 1964, Ser. No. 403,758
6 Claims. (Cl. 324—71)

ABSTRACT OF THE DISCLOSURE

A method and apparatus for indicating the extent to which a set of rolls have worn. The wear is a function of the force on the rolls and the frequency of use. Invention measures the force with strain gauges on roll housing and measures the use with a tachometer. The outputs of the strain gauges and tachometer go to a watt-hour meter, the reading on which furnishes an indication of the wear on the rolls and their remaining useful life.

---

This invention relates to a method and apparatus for indicating the degree of wear on the work rolls of a rolling mill.

In the operation of a rolling mill it is helpful to have an indication of the degree to which the rolls have worn so that maintenance schedules may be established and replacement rolls made available in the most efficient manner. The rate at which rolls wear depends both on the magnitude of frictional forces between the rolls and work and the frequency of contact between each point on the roll surface and the work. I know of no way of measuring friction directly, but friction is proportional to the rolling force, which can be measured through the use of strain gauges, for example.

An object of the present invention is to provide a method and apparatus for continuously indicating roll wear by measuring both the rolling force and the frequency of contact and combining these factors.

A further object is to provide an apparatus of the foregoing type which embodies only simple conventional components and which can be installed readily on existing rolling mills.

In the drawing:
The single figure is a diagrammatic side elevational view of a rolling mill equipped with a wear-indicating apparatus in accordance with my invention.

The drawing shows one stand 10 of a conventional rolling mill used for reducing the thickness of metal workpieces W. The roll stand includes a housing 12, upper and lower chocks 13 and 14 mounted in the housing, upper and lower work rolls 15 and 16 journaled in the respective chocks, and a screw-down mechanism 17. Conveyor rollers 18 carry a workpiece W to the roll stand, and other conveyor rollers 19 carry the workpiece away. The particular roll stand illustrated is only an example of one type to which my indicating apparatus can be applied, and does not limit the invention.

In accordance with my invention, I mount four strain gauges connected to form a bridge circuit 20 in a block 21 below the lower work roll 16. I connect a power supply 22 to the input terminals of the bridge and a conventional amplifier 23 to the output terminals. I connect the current terminals of a conventional watt-hour meter 24 to the output terminals of the amplifier. The D-C output of bridge 20 is proportional to the rolling force. I adjust the parts so that there is no output unless the rolls are engaging a workpiece. Thus the current reaching the watt-hour meter 24 is a measure of the rolling force.

I couple the speed shaft of a tachometer-generator 25 mechanically to one of the work rolls 15 or 16. I connect the output terminals of the tachometer-generator to opposite ends of the slide wire of a potentiometer 26. I also connect one of the terminals of the tachometer to one voltage terminal of the watt-hour meter, and connect the arm of potentiometer 26 to the other voltage terminal of the watt-hour meter. The tachometer-generator produces a voltage which is proportional in magnitude to the roll speed. This voltage is impressed on the watt-hour meter, and by adjusting the arm of potentiometer 26, I may adjust the output voltage from the tachometer to make any predetermined voltage correspond with any desired number of revolutions of the work rolls.

My apparatus applies current to the watt-hour meter proportional to the rolling force or friction, and applies voltage proportional to the roll speed. The rate at which the work rolls wear is directly proportional to the product of these two factors. The watt-hour meter automatically multiplies the current and voltage and integrates the product. For the indication to be significant it is necessary first to establish a standard. I accomplish this by using a particular set of rolls until they have worn to an unsatisfactory extent. I then use the final reading on the watt-hour meter obtained with these rolls as a standard for comparing readings obtained with other rolls. In this manner the readings furnish an indication of how much remaining useful life the rolls have at any time.

From the foregoing description it is seen that my invention affords a simple effective method and apparatus for indicating the degree of wear on the work rolls of a roll stand. One obvious modification of the apparatus is to reverse the connections, whereby the current signal is proportion to the roll speed and the voltage signal proportional to the rolling force.

While I have shown and described only a single embodiment of my invention, it is apparent that modifications may arise. Therefore, I do not wish to be limited to the disclosure set forth but only by the scope of the appended claims.

I claim:
1. A method of indicating the degree of wear on the work rolls of a roll stand comprising producing a signal of a magnitude proportional to the rolling force developed between the rolls, producing a signal of a magnitude proportional to the speed of rotation of the rolls, and combining the two signals to obtain a signal which is representative of the roll wear.

2. A method as defined in claim 1 in which one of said first two named signals is a current signal and the other a voltage signal, and said signals are combined as a watt-hour signal.

3. A method of indicating the degree of wear on the work rolls of a roll stand comprising producing a current signal proportional to the rolling force developed between the rolls, producing a voltage signal proportional to the speed of rotation of the rolls, and introducing said signals to a watt-hour meter to obtain a signal proportional to the product thereof over a period of time, said last-named signal being representative of the roll wear.

4. The combination, with a roll stand which includes a housing and a pair of work rolls journaled in said housing and adapted to develop a rolling force between them as they rotate, an apparatus for indicating the degree of wear on said rolls, said apparatus comprising means operatively connected with said roll stand for producing a signal of a magnitude proportional to the rolling force, means operatively connected with one of said rolls for producing a signal of a magnitude proportional to the speed of rotation, and means operatively connected with both said signal-producing means for combining the two signals and thereby obtaining a signal which is representative of roll wear.

5. A combination as defined in claim 4 in which one of said first and second named signals is a current signal and the other a voltage signal, and said combining means is a watt-hour meter which combines said first and second named signals as a product integrated over a period of time.

6. The combination, with a roll stand which includes a housing and a pair of work rolls journaled in said housing and adapted to develop a rolling force between them as they rotate, of an apparatus for indicating the degree of wear on said rolls, said apparatus comprising a plurality of strain gauges mounted on said roll stand and connected to form a bridge circuit, a voltage source connected to the input of said bridge circuit, the current output of said bridge circuit being of a magnitude proportional to the rolling force, an amplifier connected to receive the output of said bridge circuit, a tachometer-generator connected to one of said rolls to produce a voltage of a magnitude proportional to the speed of rotation, a potentiometer connected to said tachometer-generator for adjusting the voltage level, and a watt-hour meter having current terminals connected to said amplifier and voltage terminals connected to said potentiometer, whereby said watt-hour meter obtains the product of the current and voltage integrated over a period of time, thereby producing a signal which is representative of roll wear.

References Cited

UNITED STATES PATENTS

| 880,483 | 2/1908 | Derihon | 73—7 |
| 2,248,504 | 7/1941 | Kenny | 324—140 |
| 2,342,374 | 2/1944 | Shayne et al. | 73—15.6 |
| 3,200,641 | 8/1965 | Stark | 73—138 |

RUDOLPH V. ROLINEC, *Primary Examiner.*

E. E. KUBASIEWICZ, *Assistant Examiner.*